United States Patent [19]

Neal

[11] Patent Number: 4,947,253
[45] Date of Patent: Aug. 7, 1990

[54] BRIGHTNESS MODULATOR FOR CLOSED LOOP COMPENSATION OF BLACK LEVEL

[75] Inventor: Charles B. Neal, Zionsville, Ind.

[73] Assignee: RCA Licensing Corporation, Princeton, N.J.

[21] Appl. No.: 339,847

[22] Filed: Apr. 18, 1989

[51] Int. Cl.⁵ .................. H04N 5/52; H04N 5/57; H04N 5/228; H04N 5/68
[52] U.S. Cl. ..................... 358/174; 358/168; 358/169; 358/219; 358/183; 358/243
[58] Field of Search ............ 358/243, 168, 169, 74, 358/174, 219, 182, 183

[56] References Cited

U.S. PATENT DOCUMENTS

| | | | |
|---|---|---|---|
| 3,804,981 | 4/1974 | Avins | 358/168 |
| 3,873,767 | 3/1975 | Okada et al. | 358/168 |
| 3,886,305 | 5/1975 | Yew et al. | 358/169 |
| 3,969,579 | 7/1976 | Logan et al. | 358/168 |
| 4,005,262 | 1/1977 | Fijisawa et al. | 358/169 |
| 4,126,884 | 11/1978 | Shanley | 358/21 |
| 4,137,552 | 1/1979 | Serafini | 358/243 |
| 4,253,110 | 2/1981 | Harwood et al. | 358/243 |
| 4,253,121 | 2/1981 | Avery | 358/243 |
| 4,356,508 | 10/1982 | Okada | 358/29 |
| 4,520,397 | 5/1985 | Hibi | 358/168 |
| 4,638,360 | 1/1987 | Christopher et al. | 358/148 |
| 4,652,908 | 3/1987 | Fling et al. | 358/37 |
| 4,656,515 | 4/1987 | Christopher | 358/183 |
| 4,656,516 | 4/1987 | Fling et al. | 358/183 |
| 4,663,668 | 5/1987 | Rabil et al. | 358/168 |

Primary Examiner—John K. Peng
Attorney, Agent, or Firm—Joseph S. Tripoli; Joseph J. Laks; Harvey D. Fried

[57] ABSTRACT

A contrast control circuit develops a video gain control signal for continuously varying the video gain of a video signal to adjust the contrast of the video signal and limit beam current. The contrast control circuit may comprise an auto contrast control responsive to video signal peaks, a contrast limiter responsive to a beam current control signal related to average picture intensity and a manual control. A brightness modulator is also responsive to the contrast control signal for continuously adjusting the brightness of the video signal inversely with the contrast. The brightness modulation is especially useful as part of a pix-in-pix video control circuit, further comprising video sources for first and second video signals and a selector for alternatively feeding the first and second video signals to a video amplifier to form a primary picture with an inset secondary picture.

21 Claims, 3 Drawing Sheets

BRIGHTNESS MODULATOR FOR CLOSED LOOP COMPENSATION OF BLACK LEVEL

This invention relates generally to electron beam current limiting in kinescopes of television receivers, video monitors and the like. More particularly, the invention relates to the field of electron beam current limiting in conjunction with image contrast and brightness control.

This application is related to copending and commonly owned application serial no. 339,841 filed concurrently herewith and entitled BEAM CURRENT LIMITER WITH BRIGHTNESS CONTROL THRESHOLD EXTENSION, the teachings of which are incorporated herein by reference.

Content of an image reproduced by a kinescope in a color television receiver and the like comprises luminance information and chrominance information. The luminance information is particularly defined by a peak-to-peak amplitude of an image representative video signal, relating to image contrast, and the DC content of the video signal, relating to image brightness or background level. Image brightness or background level is related to a black level.

The electron beam current drawn by a kinescope is both a function of the amplitude and the DC content of the video signal coupled to the kinescope. Excessive beam current can be caused by a combination of video signal content and adjustment of manual brightness and contrast control circuits often included in a luminance signal processing channel of the receiver or monitor. The likelihood of high beam current being produced increases in the presence of video signals representative of bright images containing predominantly white information, manual contrast or brightness control settings at a maximum position, or a combination of these factors.

Excessive peak beam current may cause a receiver to produce a degraded image due to effects such as electron beam spot defocusing or localized blistering of the shadow mask, with its consequent adverse effect on color purity. Excessive average beam current may adversely affect performance of a receiver's deflection system, may result in blooming and may cause a receiver to be damaged. Some form of automatic contrast control system is often included in receivers to limit peak beam current under signal and viewer adjustment conditions which do not result in high average beam current. Such systems respond at least to some degree to the peak value of the video signal and automatically reduce contrast, thereby limiting peak current. Receivers usually are provided with an automatic beam limiter circuit to prevent excessive average beam current. Such a circuit senses beam current, and automatically reduces contrast or brightness levels, or both, when beam current exceeds a threshold.

Automatic beam current limiting may present problems even for levels of beam current which are not necessarily excessive. A beam current limiter should function without unnecessarily increasing a viewer's perception of changes in image content due to operation of the beam limiter. Generally speaking, a viewer can often perceive changes in the background illumination of an image produced by changes in image brightness more readily than image contrast. Accordingly, beam current limiting in safe ranges of beam current levels is preferably effected by automatic contrast control. However, it is also important that beam current limiting be accomplished without unduly upsetting the relationship between contrast and brightness and between luminance and chrominance information of a reproduced image. The prior art also recognizes a need to control brightness as well, for example, after a certain range of contrast control has been exhausted.

Various automatic beam current limiter systems are known which operate in conjunction with contrast and brightness control circuits of a television receiver and the like. Many systems provide for progressive control of contrast and brightness over different ranges of beam current, as described in the following U.S. Pat. Nos.: 4,126,884—Shanley, II; 4,253,110—Harwood, et al.; 4,253,121—Avery; and 4,137,552—Serafini.

A particular problem sometimes arises when beam current limiting circuits affecting brightness as well as contrast, for example by adjusting video gain, operate within ranges of beam current levels which are not necessarily excessive or dangerous. The condition occurs generally where most of a picture frame is quite bright, that is, having high white levels, but a small portion of the image is rather dark. The high white levels over most of the image will cause a high average beam current level, which will be interpreted by automatic beam limiter circuits as an excessive brightness level which needs to be compensated. Accordingly, such automatic circuits will reduce the contrast level or the brightness level, or both levels simultaneously. The reduction in contrast or brightness, or both, has little perceptible effect on the quality of the larger and brighter image, but tends to make the smaller, originally darker portion of the image even darker. The smaller image portion may become so dark as to be essentially imperceptible. In any event, important detail in the smaller, dark portion of the picture may be difficult to see, if visible at all.

Contrast control circuits generally vary the contrast of an image by generating a control signal which varies the gain of the video amplifier for the video image. Varying the gain also causes variation of brightness, which increases and decreases directly with video gain. This was noted in the context of manual contrast controls in U.S. Pat. No. 3,873,767—Okada, et al. A video signal control circuit includes a brightness control circuit responsive to manual operation thereof to vary the DC potential applied to a signal transmission channel and a contrast control circuit responsive to manual operation thereof to vary the gain of a video amplifier. Level control means are coupled to the signal transmission channel for compensating variations in the DC potential on the signal transmission channel when manual adjustment of the contrast control means causes a variation in the gain determining voltage. This circuit is effective to limit the degrading effects caused by a viewer's manual misadjustment of the contrast control. However, the only brightness limiting aspect of the circuit responsive to a cathode ray tube beam current acts only in excess of a predetermined value, and simultaneously varies both the DC potential applied to the signal transmission channel and the gain of the video amplifier, to reduce both contrast and brightness. Such a circuit will not compensate for changes in brightness level due to contrast control responsive to dynamic variations in video signal levels or beam current levels.

Some television receivers now have a capacity for displaying a first picture image within a second picture image, often denoted by the term "pix-in-pix". The receiver, or the video recorder or the like, with pix-inpix capacity will display a single image during conventional operation, just as a conventional receiver without pix-in-pix capacity. However, in response to viewer commands, and under control of a microprocessor, for example, an image from a second video source, usually a different broadcast or cablecast channel, can be inset as a small picture within the primary picture. Pix-in-pix television control systems are described in considerable detail, for example, in the following U.S. Pat. Nos.: 4,638,360—Christopher, et al; 4,652,908—Fling, et al; 4,656,515—Christopher; and, 4,656,516—Fling, et al. Reference may be made to these patents for a detailed description of pix-in-pix circuits as broadly illustrated and described herein.

The capacity for pix-in-pix operation presents a particularly difficult problem for prior art automatic beam current limiter circuits. In particular, there is likely to be little, if any relationship between the video content of the inset secondary image and the video content of the large primary image. In a conventionally displayed single image, there is likely to be at least some transition in terms of picture content between a large bright background of high average picture intensity and a darker smaller portion thereof. Unnecessary darkening of the darker portion was troublesome, but was not expected to be a pervasive and constant problem. However the video content of each of the primary and secondary video signals in a pix-in-pix environment are wholly unrelated to one another. There is little likelihood of any transitional subject matter in either image, on either side of the border between the primary and inset images, which would ameliorate disparities in brightness and contrast levels between the images, as they may be adjusted simultaneously responsive to variations of video signal or beam current. The absence of any necessary correlation between the image content of the primary and secondary images in a pix-in-pix environment makes it more likely that automatic beam current limiting effected by reducing brightness together with contrast on the basis of the average or peak picture intensity of the primary image will result in degradation of the inset image. This is a problem not addressed or solved by the prior art.

In order to overcome the problem of degradation of the generally dark image portion responsive to automatic brightness reduction, for example by varying video gain based upon the picture content of a larger picture portion having relatively high average picture intensity, this invention recognizes several important factors. Firstly, there is a first range of beam current levels, including those corresponding to brief video signal peaks, within which beam current may vary, but need not be considered excessive or dangerous. Secondly, reducing contrast by reducing video gain inherently lowers brightness, which undesirably darkens already darker, relatively small image portions. Thirdly, the brightness level can be raised to counteract the undesirable effect of video gain reduction on brightness level without counteracting the beneficial control of beam current achieved by varying contrast.

It is an aspect of this invention to provide novel control of contrast and brightness levels in a first, safe range of beam current levels by effecting closed loop compensation of black level.

More particularly, it is an aspect of this invention to respond to increases of beam current levels and video signal peaks in the first, safe range of levels by lowering the contrast level of the video image by reducing video gain, for example, by conventional automatic contrast control, but at the same time, to increase the brightness level by a factor sufficient to compensate for the reduction of brightness level due to the reduction of video gain.

It is therefore an aspect of this invention to generate a first control voltage responsive to variations of video signal peaks, beam current levels and manual adjustment in a first range of beam current levels and, responsive to the control voltage, vary the video gain to vary contrast; and simultaneously, to modulate the brightness level inversely with the first control voltage to compensate for the variation in brightness level due to the video gain reduction.

It is a further aspect of this invention to reduce brightness levels responsive to values of beam current levels in a second range of levels.

A video control circuit in accordance with the foregoing aspects of the invention may comprise a gain controllable video amplifier for a video signal, the amplified video signal generating a picture having contrast and brightness characteristics which both vary directly with the gain of the amplifier, and a brightness control circuit for varying the brightness of the amplified video signal without affecting the contrast. A beam current sensing circuit is used to develop a beam current control signal related to an average picture intensity level. An automatic contrast control circuit and an automatic contrast limiter are coupled to the amplifier. The automatic contrast control circuit is continuously responsive to the video signal, and in particular, to peaks in the video signal which will cause brief peaks in the beam current which do not significantly affect the average value of the beam current. In this respect, the video signal is an indirect measure of peaks in the beam current. The contrast limiter is continuously responsive to the beam current control signal, which does not generally reflect peak conditions, but average values. The contrast control and contrast limiter may be thought of as being responsive to different aspects of beam current values, indirectly and directly, in a first range of beam current operating values. Each of the contrast control and contrast limiter circuits develops a component of a video gain control signal for continuously varying the gain of the video amplifier to adjust the contrast and control beam current.

A brightness modulator is coupled to the brightness control circuit and is responsive to the contrast control signal for developing a brightness control signal for continuously adjusting the brightness of the video signal inversely with the contrast, thereby increasing the brightness of both white and dark portions of the picture when the entire picture has a sufficiently large average picture intensity level to cause the contrast control circuit to effect reduction of the contrast and the brightness. A brightness limiter is also coupled to the brightness control circuit and is responsive to the beam current control signal in a second range of beam current operating values for developing a beam current overload control signal for reducing the brightness of the video signal and thereby controlling the beam current.

It is another aspect of this invention to maximize an effective range over which the contrast control and contrast limiter circuits and the brightness modulator are effective, without at the same time preventing timely operation of the brightness limiter. In accordance with this aspect of the invention, the beam current control signal is filtered to remove certain characteristic AC noise signals which do not significantly alter the average level of sensed beam current, but are likely to engender premature operation of the brightness limiter. The brightness limiter is operated responsive to the filtered beam current control signal, so as to preclude undesirable operation of the brightness limiter when the beam current is in the first range of operating values.

It is yet another aspect of this invention to provide a pix-in-pix video control circuit, comprising a first video source for a first video signal, a second video source for a second video signal and a video source selector for alternatively feeding the first and second video signals to a video amplifier in time sequence to form a primary picture from the first video source with an inset secondary picture from the second video source. The pix-in-pix video control circuit further comprises a gain controllable video amplifier with the video signals, a brightness control circuit, a beam current sensing circuit, a contrast control circuit, a contrast limiter, a brightness modulator and a brightness limiter, as described above. The brightness control signal developed by the brightness modulator provides for continuous adjustment of the brightness of the video signal inversely with the contrast and thereby provides increased brightness levels for both the primary and secondary pictures when the primary picture has a sufficiently large average picture intensity level to cause the contrast control circuit to effect reduction of the contrast, and therefore also reduction of the brightness level. The pix-in-pix video control circuit in accordance with this aspect of the invention may also comprise the filter circuit for filtering AC components from the beam current control signal to preclude premature operation of the brightness limiter.

It is yet another aspect of this invention to provide a video control circuit and a pix-in-pix video control circuit as described above, wherein the brightness modulator is also effective for manually varied levels of contrast and brightness.

These and other aspects of the invention may be better understood with reference to the drawings, in which.

Figure 1:
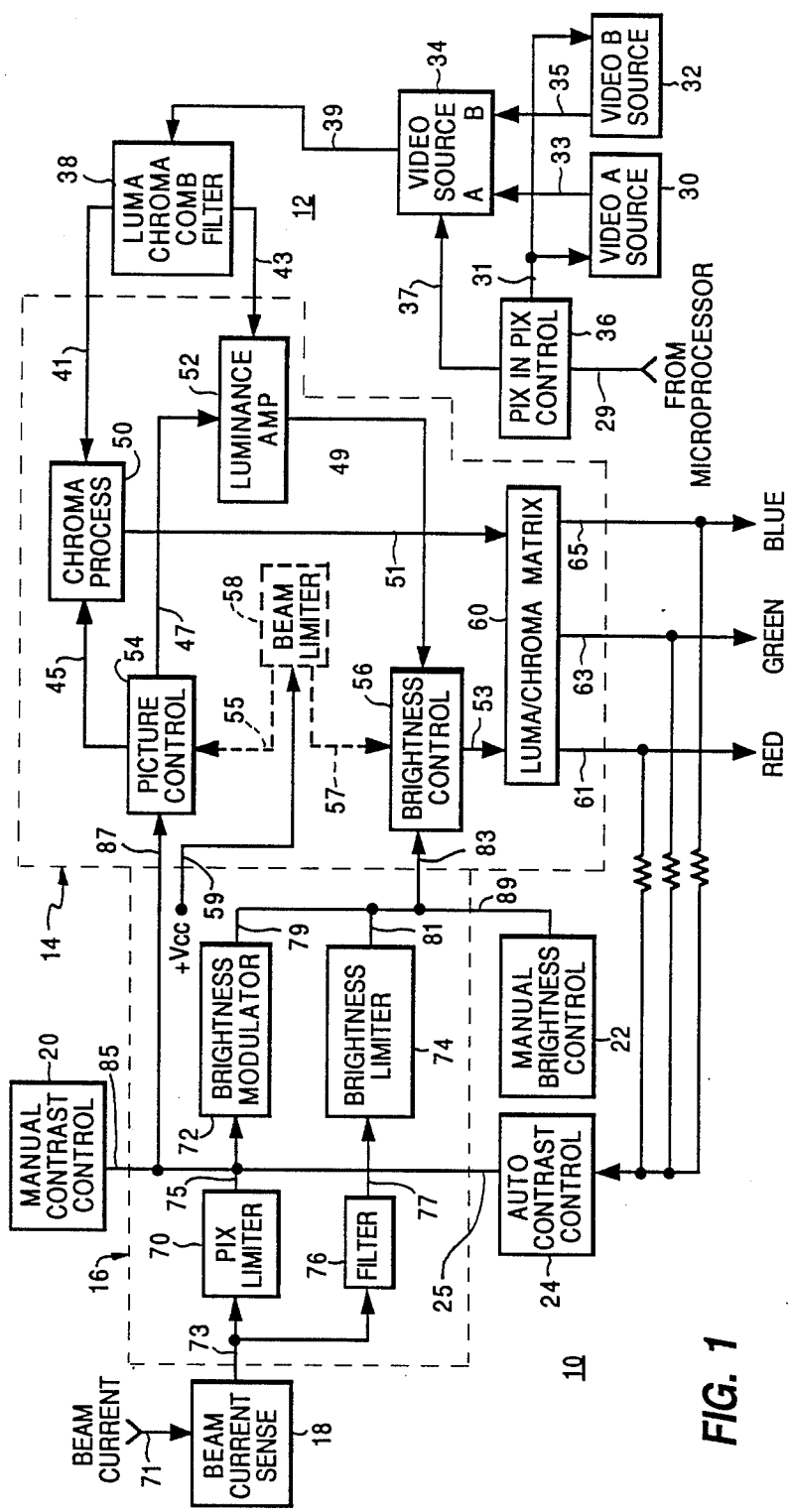
FIG. 1 is a block diagram of a pix-in-pix video control circuit in accordance with this invention.

A pix-in-pix video control circuit is shown in block diagram form in FIG. 1 and generally designated by reference numeral 10. The pix-in-pix video control circuit 10 comprises a pix-in-pix circuit 12, a luma/chroma processing circuit 14, a beam current limiter circuit 16, a beam current sensing circuit 18, an automatic contrast control circuit 24, a manual contrast control circuit 20 and a manual brightness control circuit 22.

The pix-in-pix circuit 12 comprises a first video source 30 for a first video signal A and a second video source 32 for a second video signal B. The video A signal and the video B signal are coupled as inputs to video source switch 34 by lines 33 and 35 respectively. A pix-in-pix control circuit 36 operates the first and second video sources 30 and 32 over line 31 and operates the video source switch 34 over line 37. Responsive to command signals over line 29, for example from a microprocessor, the pix-in-pix control circuit 36 operates the video source switch and the first and second video sources to alternately feed the video A and video B signals to the video amplifier on line 39 in timed sequence to form a primary picture, for example from the video A source, with an inset secondary picture, for example from the video B source. Alternatively, the pix-in-pix control circuit may be commanded by the microprocessor to select only one or the other of the video A and video B sources as an output of the video source switch 34.

It will be remembered that luminance indicates the amount of light intensity, which is perceived by the eye as brightness. In a black and white picture, the lighter parts have more luminance than the dark areas. Different colors also have shades of luminance, however, as some colors appear brighter than others. Chrominance on the other hand, denotes both hue and saturation of a color. The chrominance includes all the color information, but without the brightness information. The chrominance and brightness, that is luminance, together specify the picture information completely. The output of the video source switch 34 is an input to a luma/chroma comb filter 38. The output of the comb filter on line 41 is chrominance information and the output of the comb filter on line 43 is luminance information. The outputs of the comb filter 38 are inputs to the luma/chroma processing circuit 14. Such circuits as the luma/chroma processing circuit 14 may be embodied as integrated circuits. Such a luma/chroma processing chip is available as RCA part no. 1421882-1, Thomson Consumer Electronics, Indianapolis, Ind. Only those portions of such a luma/chroma chip as are pertinent to this invention are illustrated.

The chrominance output of the comb filter 38 is an input to a chroma processing circuit 50. The luminance output of the comb filter 38 is an input to a luminance amplifier 52. A picture control circuit 54 controls video gain of the luminance and chrominance channels, and has outputs on lines 45 and 47, which are inputs respectively to the chrominance processing circuit 50 and the luminance amplifier 52. The output of the luminance amplifier 52 is an input to a brightness control circuit 56. Brightness control circuit 56 raises and lowers the brightness level, also termed black level. The output of the brightness control circuit 56 on line 53 and the output of the chroma processing circuit 50 on line 51 are inputs to a luma/chroma matrix 60. The outputs of the luma/chroma matrix 60 on lines 61, 63 and 65 provides output for the red, green and blue video signals, respectively. Each of the outputs on lines 61, 63 and 65 is passed through a resistor, after which the outputs are summed as an input to a conventional automatic contrast control circuit 24. This enables beam current limiting to be effected responsive to video peak intensity, as well as average picture intensity. This can prevent localized defocusing and blistering of the shadow mask.

A video signal is generally clamped to a DC level at 0 IRE (back porch of the composite video signal), whereas the black level in NTSC signals is nominally adjusted to be approximately 7.5 IRE. White level is nominally 100 IRE. Accordingly, an increase in video gain causes the displayed black level to move "brighter" as video gain is increased and causes the displayed black level to move "darker" as video gain is decreased. When beam current limiting circuits also respond to increases in beam current levels by reducing brightness, that is lowering the black level, the effect can be pronounced.

The picture control circuit has an input on line 87. The brightness control circuit 56 has an input on line 83. For purposes of definition, and in accordance with operation of the integrated circuit chip identified above, an increase in a voltage level applied to input line 87 of picture control 54 will increase the gain of the video amplifier. The increase in video gain will therefore increase the contrast level and increase, or raise, the brightness level. A reduction in the voltage on line 87 will cause a reduction in video gain, which will result in a reduction of the contrast level and a reduction of the brightness level. Similarly, an increase of voltage on input line 83 to brightness control 56 will be effective to raise the brightness level of the video signal, and a reduction of voltage on line 83 will be effective to lower the brightness level. However, variations of the voltage level on input line 83 to brightness control circuit 56 will not affect the video gain, and accordingly, will not change the contrast level.

In the particular embodiment which is disclosed in the drawings, which utilizes a luma/chroma chip as identified above, a beam limiter circuit 58 is also provided. Beam limiter circuit 58 is shown by a block drawn in phantom, because it is not utilized in the invention. In order to render the beam limiter 58 ineffective, its input on line 59 is permanently coupled to a substantially uniform and raised voltage level +Vcc. This indicates, albeit falsely, that beam current is very low. When the input to beam limiter circuit 58 is thus tied high, its outputs on lines 55 and 57, to the picture control 54 and brightness control 56 respectively, are unchanging and of no effect. In this manner it is possible to disable the integrated beam limiter circuit 58, and substitute the beam limiter circuit 16 to which an aspect of this invention is directed.

The specific operation of the luma/chroma comb filter, the chroma processing circuit, the luminance amplifier and the luma/chroma matrix are known, and accordingly, are neither shown nor explained in detail. The operation of the beam limiter circuit 58, which is bypassed, was in accordance with a prior art scheme, which adjusted contrast and brightness in the same direction in a first range of beam current levels, and in a higher range of beam current levels than in the first range, adjusted brightness level. It is the less than optimum operation of such a beam limiter circuit, particularly in the context of a pix-in-pix video environment, which prompted the development of the brightness modulator circuit taught herein.

Electron beam current on line 71 is monitored by beam current sensing circuit 18. Beam current sensing circuit 18 develops a beam current control voltage on line 73, which is an input to a contrast, or "pix", limiter circuit 70 and a filter 76. In accordance with the circuit schematic shown in FIG. 2, the beam current control signal is a voltage signal, which is at a maximum when beam current is at minimum, and is at a minimum when beam current level is at maximum.

The pix limiter circuit 70 is an automatic contrast limiting circuit, which develops one component of a contrast, or pix, control voltage on output line 75 responsive to dynamic variations of beam current related to average picture intensity. Another component of the pix control voltage is the output of the automatic contrast control 24 on line 25, indirectly responsive to dynamic variations of beam current related to peak picture intensity. The automatic contrast control is directly responsive to a signal derived from the video signal. A third component of the pix control voltage is the output of the manual contrast control 20 on line 85. The pix control voltage on line 75 is an input to a brightness modulator circuit 72 and the input line 87 of picture control circuit 54. A net increase of the pix control voltage, due to any or all of its components, causes the picture control circuit 54 to increase the video gain, which increases the contrast level and raises the brightness level. A net decrease in the pix control voltage causes the picture control circuit 54 to reduce the video gain, decreasing contrast and lowering the brightness level. The pix control voltage is varied, through direct and indirect means, as a function of beam current.

Figure 2:
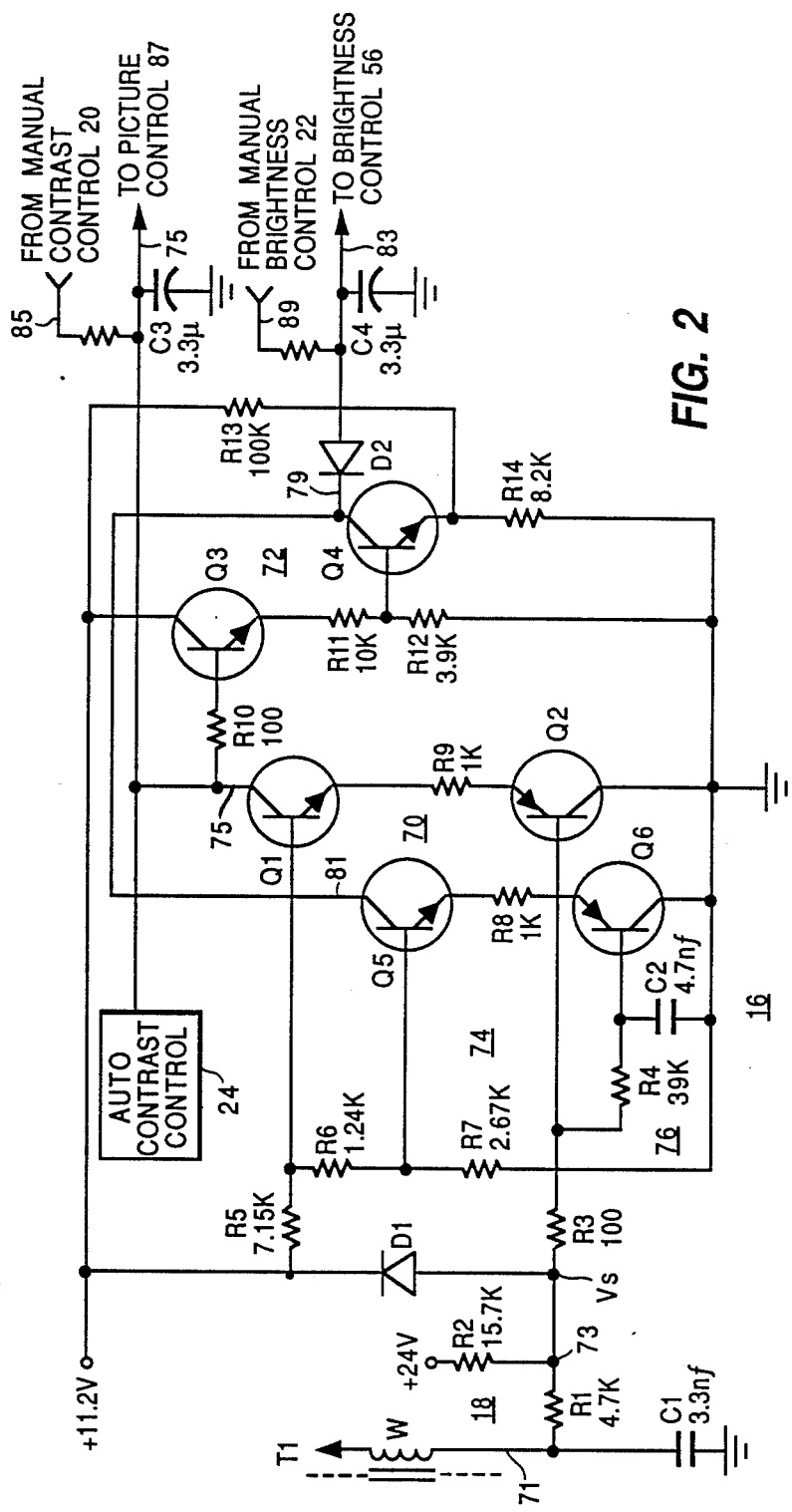
FIG. 2 is a circuit schematic for the beam current limiting circuitry shown in FIG. 1; and, FIG. 3 is a graph illustrating variation of the brightness control voltage produced by the brightness modulator as a function of the contrast level control voltage.
Figure 3:
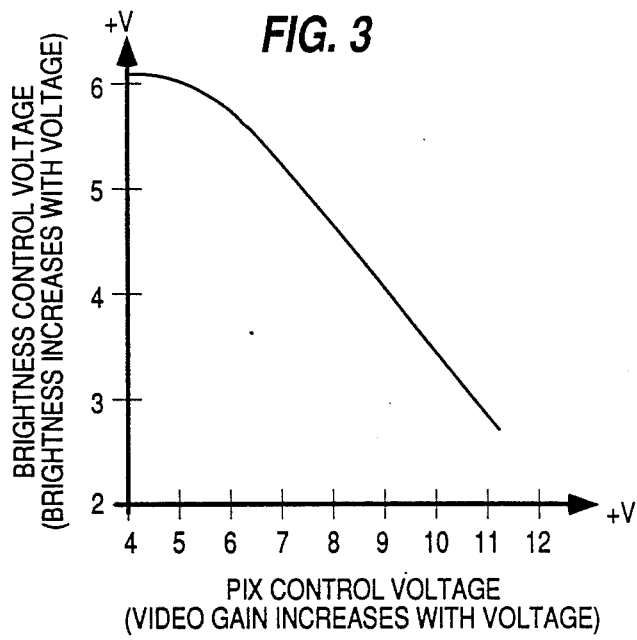

The brightness modulator circuit 72 provides an output control voltage on line 79 which varies inversely with the pix control voltage, as illustrated in FIG. 3. The values correspond to operation of the specific circuit shown in FIG. 2. When the pix control voltage increases, the voltage of the brightness control signal on line 79 decreases, which causes the brightness control circuit 56 to lower the brightness level. Conversely, when the pix control voltage falls, the brightness control voltage rises, causing the brightness control circuit 56 to raise the brightness level. Increasing the video gain increases the contrast level, and at the same time, raises the brightness level. Conversely, reducing the video gain reduces the contrast level and lowers the brightness level. The brightness control signal is therefore effective to raise the brightness level when the contrast level is reduced and to lower the brightness level when the contrast level is increased. The brightness modulator therefore counteracts the undesirable reduction of the brightness level when the contrast is decreased responsive to an increase in beam current or peaks in the video signal.

The brightness modulator 72 is effective in a first range of beam current operating values, corresponding generally to safe operating conditions. However, there are certain circumstances wherein perceived image quality is less important than the dangers of excessive beam current levels. Accordingly, a brightness limiter circuit 74 is effective in a second range of beam current operating values, corresponding generally to unsafe operating conditions, that is, where neither the auto contrast control 24 nor the pix control limiter 70 is effective to prevent unsafe beam current levels. Under these circumstances, the brightness limiter circuit 74 develops a beam current overload control voltage signal on line 81, which is also coupled to input line 83 of brightness control circuit 56. It will be appreciated that, at a certain threshold value of beam current, the pix limiter 70 will have reached its full range of adjustment, so that no further changes on the input to the picture control circuit or from the brightness modulator circuit will take place. The beam current overload control signal is thereafter effective in the second range to lower the brightness level to prevent unsafe beam current levels.

In order to prevent the brightness limiter circuit 74 from generating the beam current overload control signal when auto contrast control or the pix limiter should still be capable of controlling the beam current by controlling the video gain, the beam current control signal is processed, for example, by a filter 76, to remove AC components therefrom, for example those resulting from retrace pulses. This helps assure that the brightness limiter circuit 74 will become effective only when the full range of compensation provided by the pix control voltage has been exhausted.

Most television receivers provide manually adjustable means whereby viewers may alter the contrast and brightness (picture) settings. As noted, the output of the manual contrast control circuit 20 is also coupled to the input of the brightness modulator 72, which will be effective to reduce the brightness level responsive to a manual increase of contrast, and vice versa. As in the automatic beam limiter circuit 16, the manual brightness control 22 will raise and lower the brightness level without affecting video gain and contrast level. However, the voltage level on output line 89 will be a component of the input to the brightness control circuit 56, and an unduly high manually adjusted brightness level will result in a reduced effective range of auto contrast control, the pix limiter and the brightness modulator, and will result in more frequent operation of the brightness limiter circuit.

A circuit schematic for a suitable beam limiter circuit 16 in accordance with this invention is shown in FIG. 2. An electron beam current flows through line 71 and into winding W of flyback transformer T1. A beam current sensing circuit 18 includes resistors R1 and R2, the junction of which corresponds to line 73, on which a beam current control voltage Vs is developed. Beam current control voltage Vs varies inversely with beam current. Diode D1 is connected between output line 73 and a supply voltage, for example +11.2 volts. This limits the maximum value of voltage Vs to approximately +12 volts.

The pix limiter circuit 70 comprises transistors Q1 and Q2, the emitters of which are coupled to one another through resistor R9. The base of resistor Q1 is biased by a voltage divider network comprising resistors R5, R6 and R7. For the component values shown, the base of transistor Q1, which is coupled to the junction of resistors R5 and R6, is biased at a voltage level of approximately +4 volts.

The auto contrast control circuit 24 may be embodied as a variety of specific circuits, for example as taught in U.S. Pat. No. 4,599,643, incorporated herein by reference. One such embodiment comprises a transistor. The transistor has a base electrode coupled to the three summed video outputs, a collector electrode coupled to the outputs of the pix limiter and the manual contrast control and an emitter electrode coupled by a resistive voltage divider network to a biasing voltage. An increase of video drive (amplitude) will effect reduction of the pix control voltage.

The brightness limiter circuit 74 comprises transistors Q5 and Q6, the emitters of which are coupled to one another through resistor R8. The base of transistor Q5 is also biased by the voltage divider network comprising resistors R5, R6 and R7. For the component values shown, the base of transistor Q5, which is coupled to the junction of resistors R6 and R7, is at approximately +2.7 volts. Filter 76 coupled to the base of transistor Q6 comprises resistor R4 and capacitor C2.

The brightness modulator circuit 72 comprises transistors Q3 and Q4. The base of transistor Q4 is biased by the voltage divider network comprising resistors R11 and R12, and is coupled to the junction thereof. The voltage at the emitter of transistor Q3 follows the voltage on the base thereof, and is essentially the pix control voltage. The collector of transistor Q1 is the output of the pix control circuit 70, and corresponds to output line 75. Output line 75 is an input to the picture control circuit 54 and, through resistor R10, is also an input to the brightness modulator circuit 72 at the base of transistor Q3.

The collector of transistor Q5 is the output of the brightness limiter circuit 74, and corresponds to output line 81. This is coupled to the collector of transistor Q4, which is the output of the brightness modulator 72, and corresponds to output line 79. Diode D2 does not form part of the brightness limiter or brightness modulator, but prevents conduction of transistors Q4 and Q5 when the manual, or customer, brightness control is set abnormally low. Resistor R5 of the voltage divider network, the collector of transistor Q3 and one terminal of resistor R13 are coupled to the supply voltage +11.2 volts. Resistor R13 and resistor R14 form a voltage divider network for biasing the emitter electrode of transistor Q4, which is coupled to the junction thereof. When transistor Q3 is not conducting, the emitter of transistor Q4 is at a voltage level of approximately +0.85 volts.

The output of the manual contrast control circuit will result in a voltage level on input line 75 to the picture control circuit, which voltage will also appear at the collector of transistor Q1, which is the output of both the auto contrast control 24 and the pix limiter circuit 70. Assuming, for example, that beam current is at a minimum and that the voltage Vs is at a maximum, a nominal factory setting of the manual contrast control, for the component values illustrated, will generate a voltage level of approximately +7.8 volts on line 75 at the input to the picture control circuit and on the collector of transistor Q1. Transistor Q3 is biased in such a fashion that it will conduct responsive to pix limiter voltages in excess of approximately +5 volts. Accordingly, even in the absence of any beam current limiting resulting from the level of voltage Vs, transistor Q3 will conduct, which in turn will cause transistor Q4 to conduct, which will set the output of the brightness modulator on line 83 to approximately +6.1 volts. This corresponds to the maximum brightness control voltage shown in FIG. 3.

Voltage Vs will fall as beam current rises. The auto contrast control will be effective, and predominate, before enough beam current flows to turn on transistor Q2. When voltage Vs falls low enough to forward bias the base emitter junction of transistor Q2, which will be approximately two diode drops below the +4 volts bias voltage on the base of transistor Q1, transistor Q1 will begin to conduct. As transistor Q1 begins to conduct, the pix control voltage on output line 75 will be pulled down. As the pix control voltage falls, the video gain will be reduced, and the contrast level will be reduced. Reduction of the video gain will also lower the brightness level, as explained above. However, as the pix control voltage falls, the voltage at the base of transistor Q3 will fall, which will reduce the conduction of transistor Q3. Less conduction of transistor Q3 will result in less conduction of transistor Q4, which will cause the voltage level at the collector of Q4 on output line 79 to increase. Accordingly, the brightness control signal will increase, and raise the brightness level to compensate for the reduction in video gain.

The value of voltage Vs at which the pix limiter circuit becomes effective will depend upon the values of resistors R5, R6 and R7, which set the bias voltage at the base of transistor Q1, which in turn sets the bias voltage for the emitter of transistor Q2. For values of average beam current below the threshold of operation of the pix limiter, the auto contrast control is responsive to the video signal. The auto contrast control responds, in particular, to peaks in the video signal to vary the pix control voltage. The brightness modulator is also responsive to the action of the auto contrast control in the first range of beam current values. As voltage Vs falls further, with increasing beam current, the pix control voltage at the collector of transistor Q1 will continue to fall and the brightness control voltage at the collector of transistor of Q4 will continue to increase.

When the voltage Vs becomes small enough, the brightness limiter circuit will become effective. More particularly, the voltage divider formed by resistors R5, R6 and R7 sets the bias voltage at the base of transistor Q5, which in turn sets the bias voltage at the emitter of transistor Q6. When voltage Vs falls approximately two diode drops below +2.7 volts, transistor Q6 will begin to conduct, which causes conduction of transistor Q5. As transistor Q5 begins to conduct, the brightness control signal at the output of the brightness modulator, namely the collector of transistor Q4, will be pulled down. This will cause the brightness control to lower the brightness level to reduce beam current. The further voltage Vs falls, the lower the brightness level will be pulled.

The filter 76 comprising resistor R4 and capacitor C2 prevents the brightness limiter from operating prematurely. In addition to the average DC voltage potential represented by voltage Vs, there is an AC component in the sensed beam current which results from the flyback system of the horizontal deflection circuit recharging the kinescope capacitance during the horizontal retrace time. Even with a flat field signal, and only moderately high beam current, the waveform may include significant negative pulses. These pulses can cause current to flow in transistor Q5 unless it is biased far below transistor Q2. Ideally, biasing transistor Q5 only moderately below Q1 should cause the brightness limiter to operate when the pix limiter circuit has reduced video gain as much as is possible and voltage Vs falls further as beam current increases further. However, the negative pulses during retrace cause the brightness limiter to conduct at lower beam current levels than desired, unless transistor Q5 is biased much below the transistor of Q1. However, it is not practical to bias transistor Q5 much below the level of transistor Q1, as the brightness limiter would not be sufficiently effective. The filter formed by resistor R4 and capacitor C2 substantially eliminates the AC component from the signal Vs. Any time delay in the operation of the brightness limiter circuit by reason of the filter network is of little practical consequence.

The brightness modulator compensates for all undesirable changes in the brightness level due to changes in the video gain responsive to the pix control voltage over a wide control range. The pix control voltage is a composite signal, having components contributed by the auto contrast control, the pix limiter and the manual contrast control. As average beam current levels reach unsafe values, in a second control range, the brightness limiter becomes effective to lower the brightness level markedly to prevent damage and picture degradation from beam current overload.

What is claimed is:

1. A pix in pix video control circuit, comprising:
   first and second sources for video signals;
   a gain controllable video amplifier for the video signals;
   a video source selector for feeding the first and second video signals to the video amplifier to form a primary picture from one of the video sources with an inset secondary picture from the other of the video sources;
   means for developing a contrast control signal related to picture intensity;
   a contrast control circuit coupled to the video amplifier and responsive to the contrast control signal for developing a video gain control signal to adjust the contrast of the video signal by varying the gain; and,
   a brightness modulator responsive to the contrast control signal for adjusting the brightness of the video signal inversely with the contrast.

2. The control circuit of claim 1, further comprising means for manually adjusting the brightness.

3. The control circuit of claim 1, wherein the means for developing the contrast control signal comprises:
   a first contrast control responsive primarily to variations in average picture intensity; and,
   a second contrast control responsive primarily to variations in peak picture intensity.

4. The control circuit of claim 3, wherein:
   the first contrast control is responsive to beam current; and,
   the second contrast control is responsive to the video signals.

5. The control circuit of claim 1, further comprising means for manually adjusting the contrast coupled to the contrast control circuit and the video amplifier.

6. A video control circuit, comprising:
   a gain controllable video amplifier for a video signal;
   means for developing a contrast control signal related to picture intensity;
   a contrast control circuit coupled to the video amplifier and responsive to the contrast control signal for developing a video gain control signal to adjust the contrast of the video signal by varying the gain;
   a brightness modulator responsive in a first range of beam current values to the contrast control signal for adjusting the brightness of the video signal inversely with the contrast; and,
   a brightness limiter responsive to a filtered beam current control signal in a second range of beam current operating values for reducing the brightness of the video signal to reduce beam current.

7. The control circuit of claim 6, further comprising means for manually adjusting the brightness 8. The control circuit of claim 6, further comprising means for manually adjusting the contrast coupled to the contrast control circuit.

9. The control circuit of claim 6, wherein the means for developing the contrast control signal comprises:
   a first contrast control responsive primarily to variations in average picture intensity; and,
   a second contrast control responsive primarily to variations in peak picture intensity.

10. A video control circuit, comprising:
    a gain controllable video amplifier for a video signal;
    means for developing a contrast control signal related to picture intensity;
    a contrast control circuit coupled to the video amplifier and responsive to the contrast control signal for developing a video gain control signal to adjust the contrast of the video signal by varying the gain; and,
    a brightness modulator responsive to the contrast control signal for adjusting the brightness of the video signal inversely with the contrast.

11. The control circuit of claim 10, further comprising:
   first and second sources for video signals; and,
   a video source selector for feeding the first and second video signals to the video amplifier to form a primary picture from one of the video sources with an inset secondary picture from the other of the video sources.

12. The control circuit of claim 10, further comprising:
   means for manually adjusting the brightness 13. The control circuit of claim 10, means for manually adjusting the contrast coupled to the contrast control circuit.

14. The control circuit of claim 10, wherein the means for developing the contrast control circuit comprises:
   a first contrast control responsive primarily to variations in average picture intensity; and,
   a second contrast control responsive primarily to variations in peak picture intensity.

15. A video control circuit, comprising:
   a gain controllable video amplifier for a video signal;
   means for developing a first control signal related to dynamic variations of picture intensity; and,
   a contrast and brightness control circuit responsive to the first control signal for simultaneously varying the contrast and brightness levels inversely with one another.

16. The control circuit of claim 15, wherein the means for developing the contrast control signal comprises:
   a first contrast control responsive primarily to variations in average picture intensity; and,
   a second contrast control responsive primarily to variations in peak picture intensity.

17. The control circuit of claim 15, further comprising:
   means for developing a beam current control signal from which high frequency components have been removed; and,
   a brightness limiter responsive to the beam current control signal for reducing the brightness of the video signal.

18. The control circuit of claim 15, wherein the contrast and brightness control circuit comprises:
   a first circuit responsive to the first control signal for developing a video gain control signal for adjusting the contrast by varying the gain; and,
   a second circuit responsive to the contrast control signal for developing a brightness control voltage which varies inversely with the video gain control signal.

19. The control circuit of claim 15, wherein the contrast and brightness control circuit comprises means for developing first and second inversely related control voltages for adjusting the video gain and brightness level, respectively.

20. The control circuit of claim 16, wherein:
   the first contrast control is responsive to beam current levels; and,
   the second contrast control is responsive to the video signals.

21. The control circuit of claim 15, wherein the first control signal is related to dynamic variations of both average and peak picture intensity.

* * * * *